Jan. 17, 1939.                F. F. RUAU                 2,144,201
                          PACKAGING TOBACCO
                        Filed Oct. 26, 1936          10 Sheets-Sheet 9
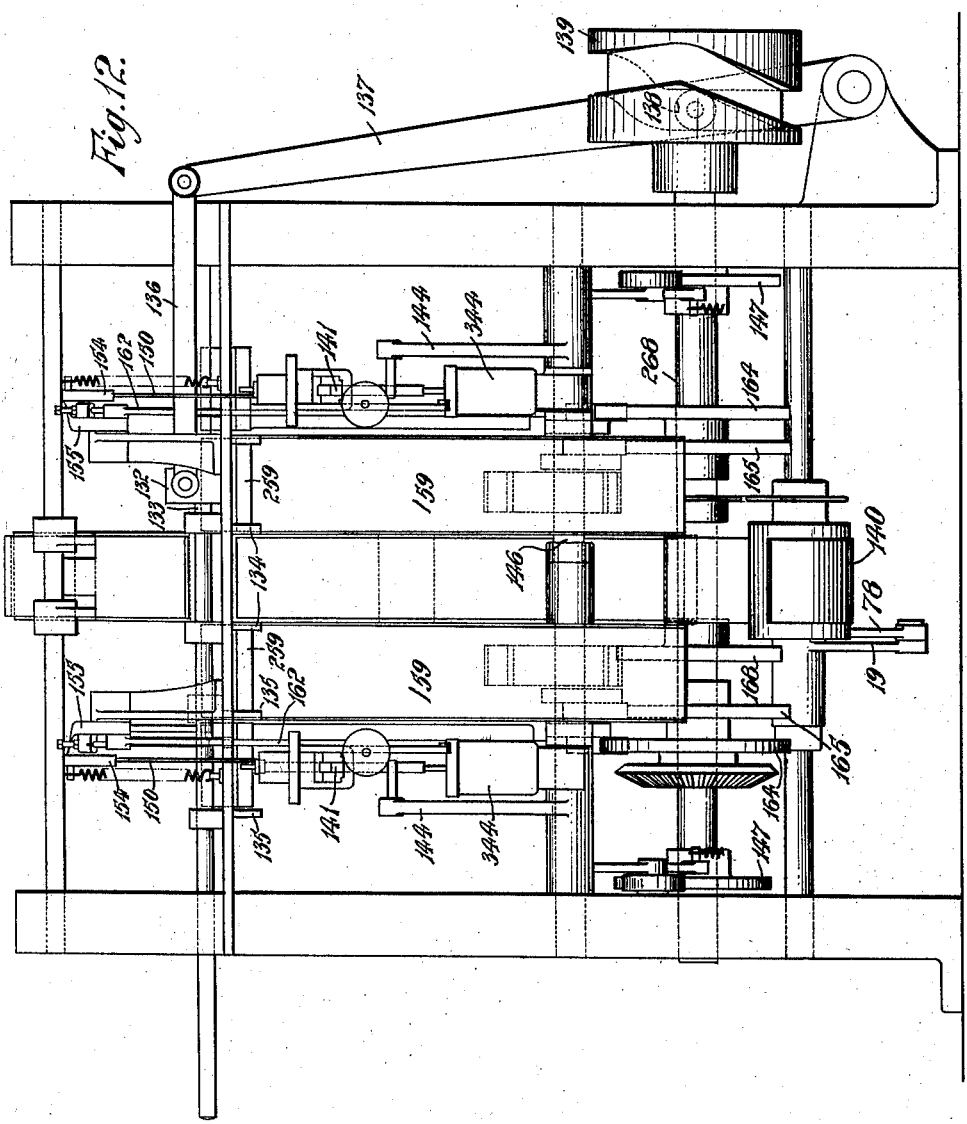

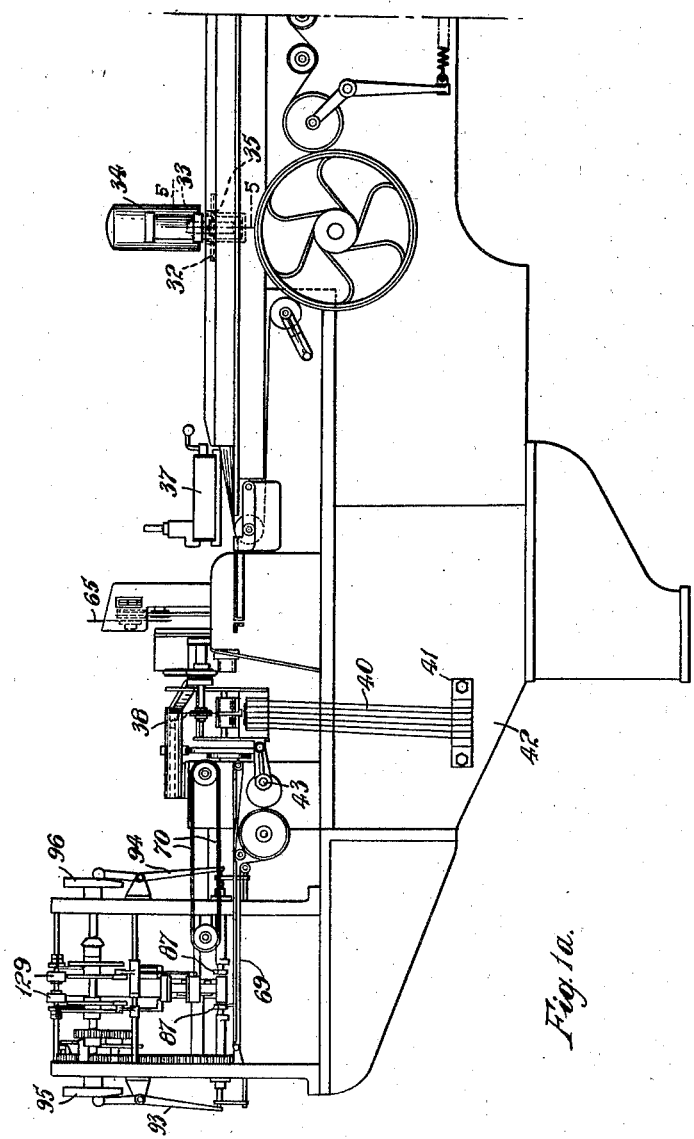

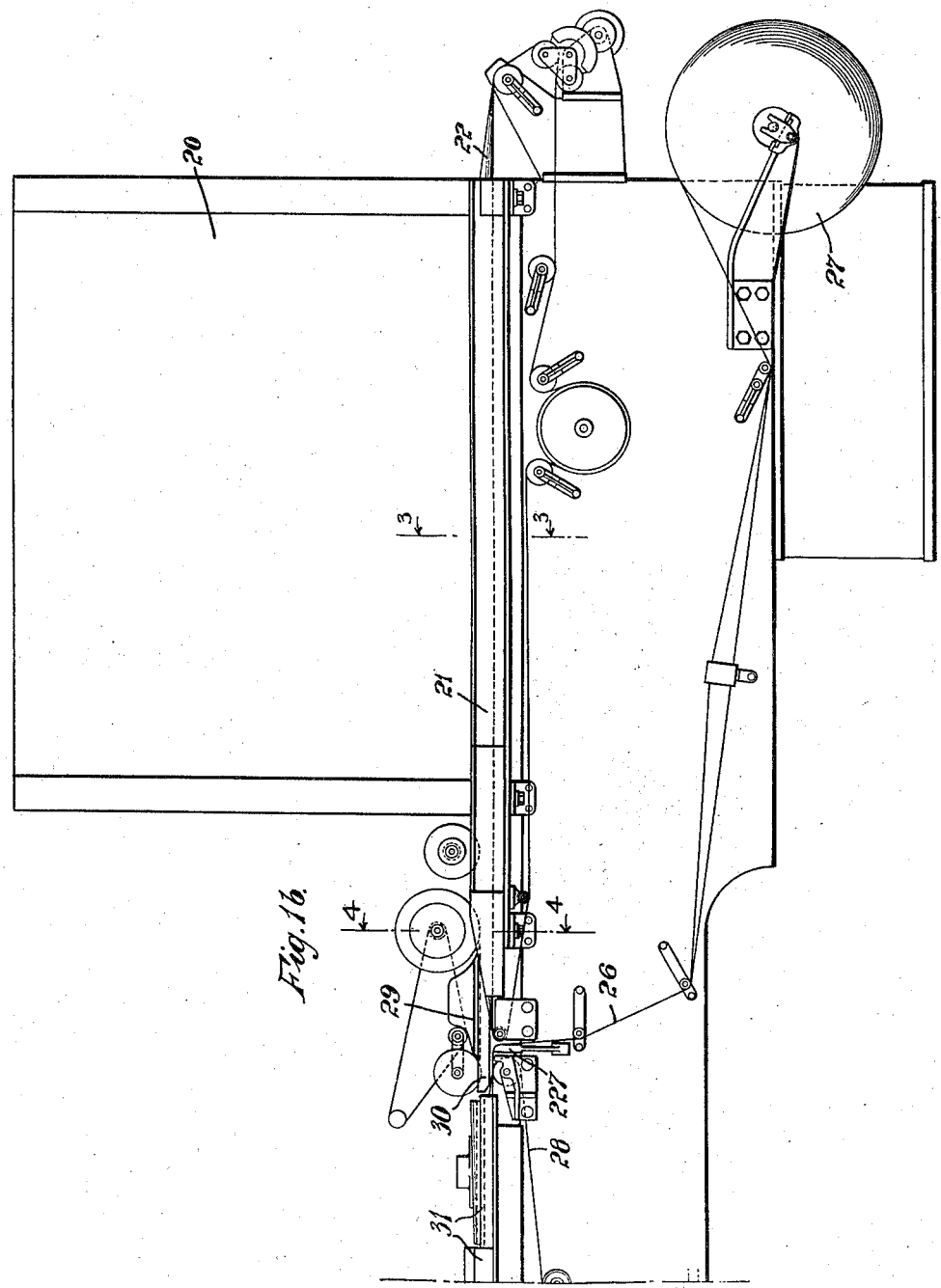

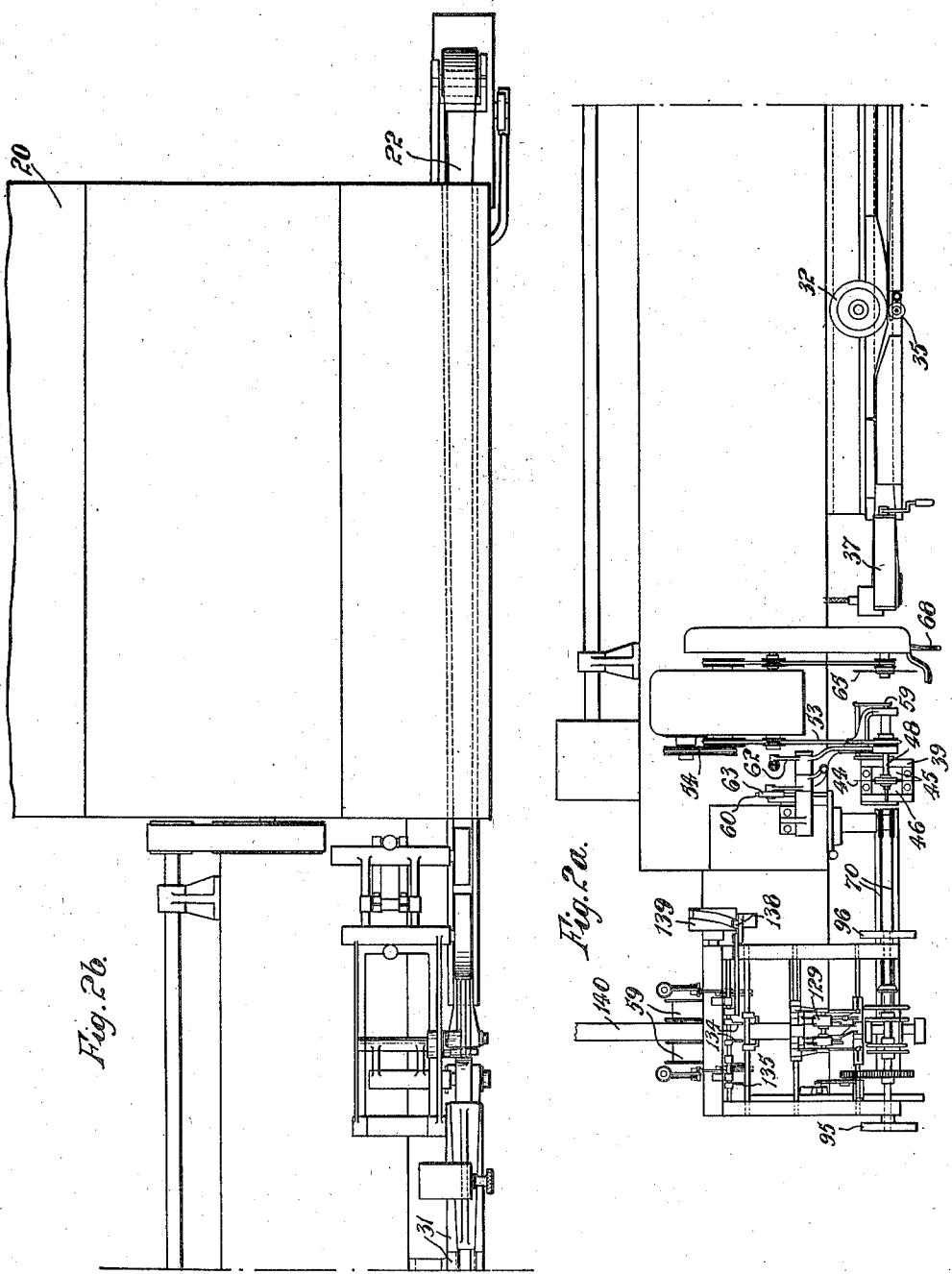

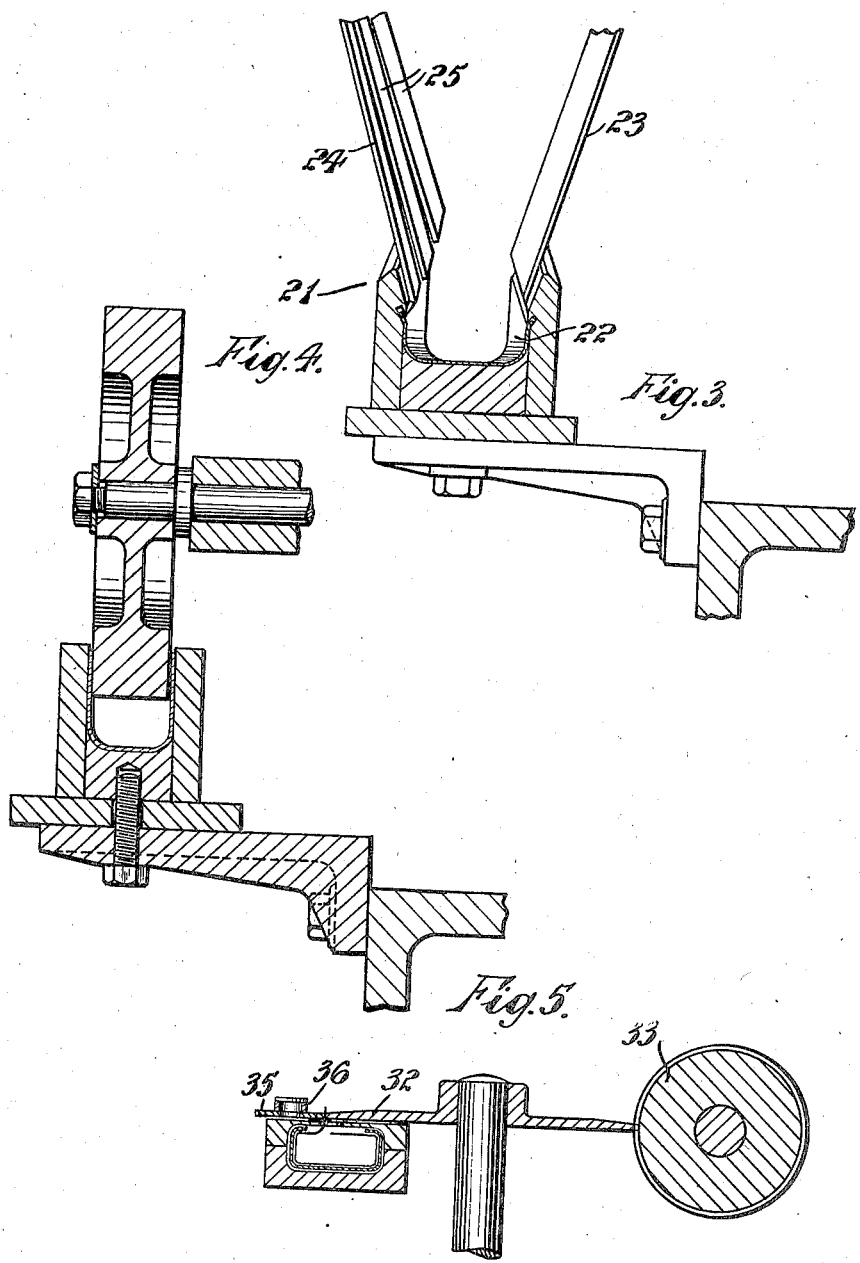

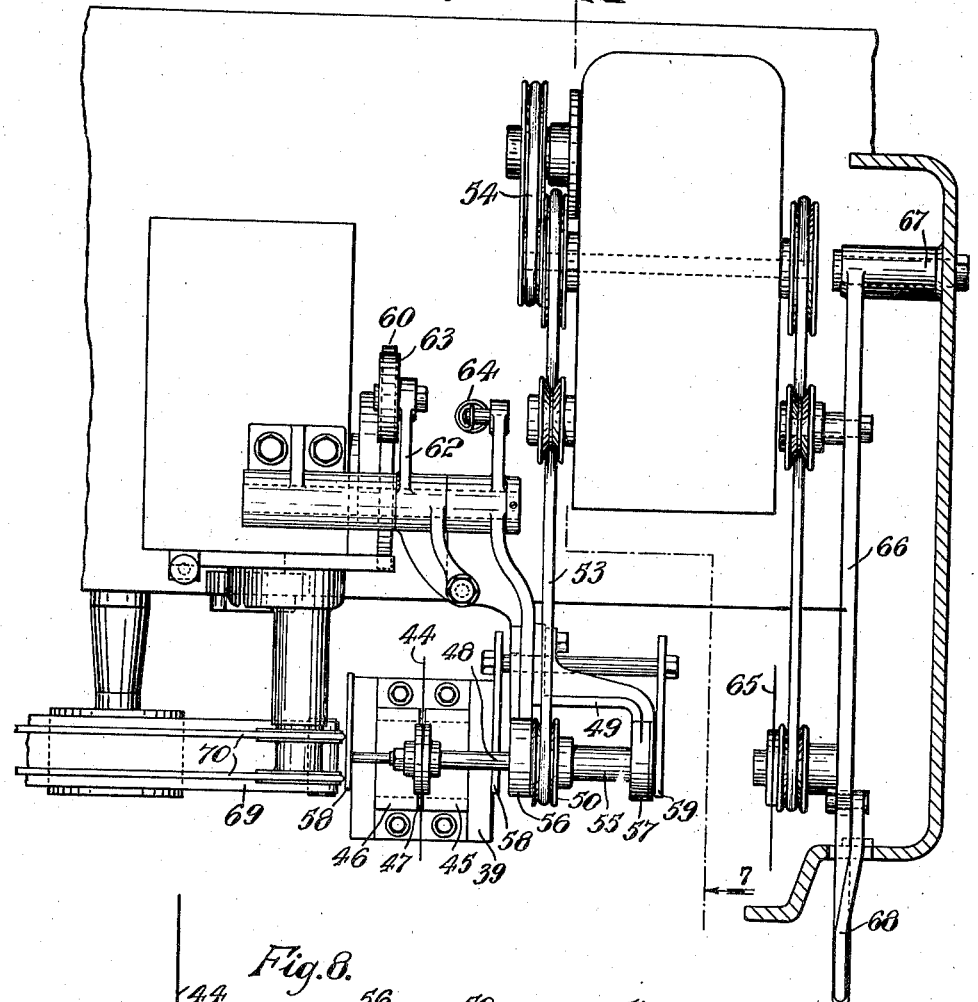
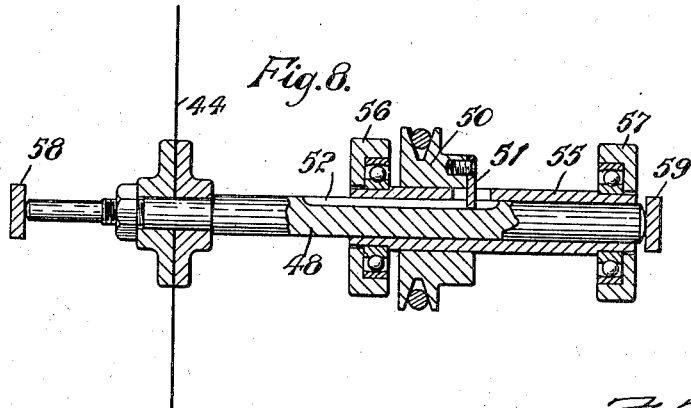

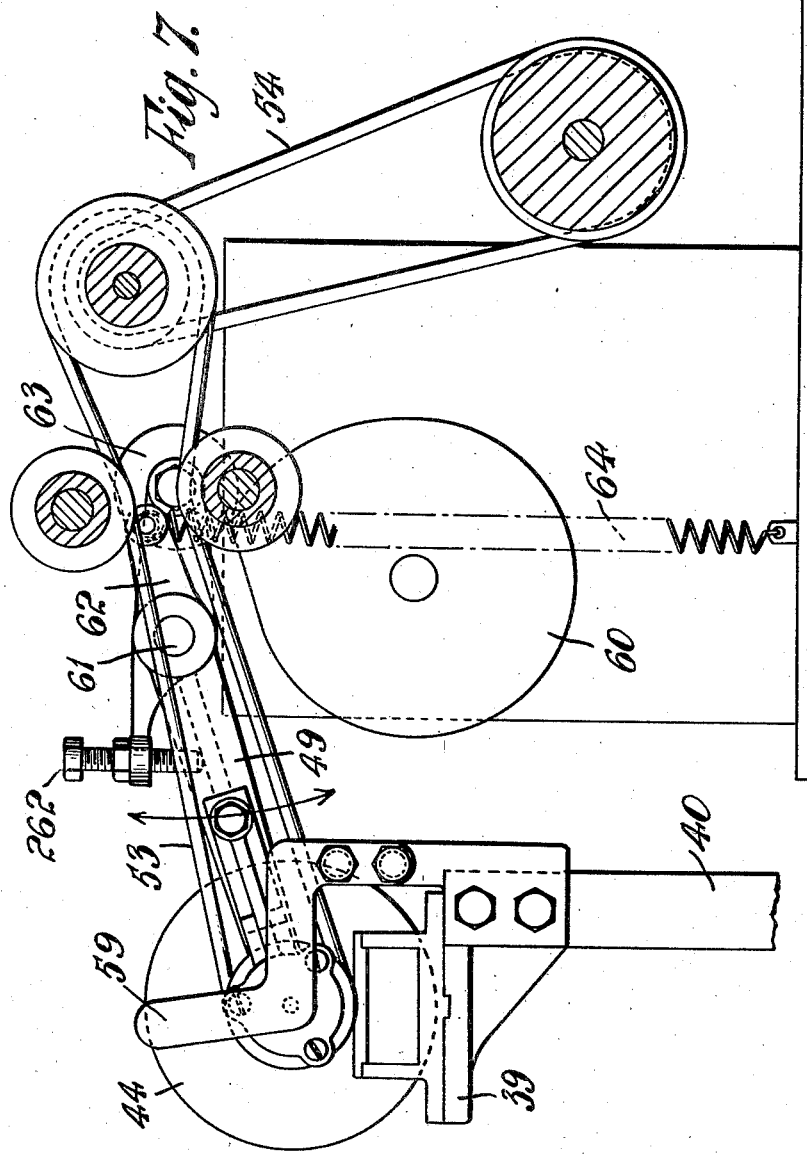

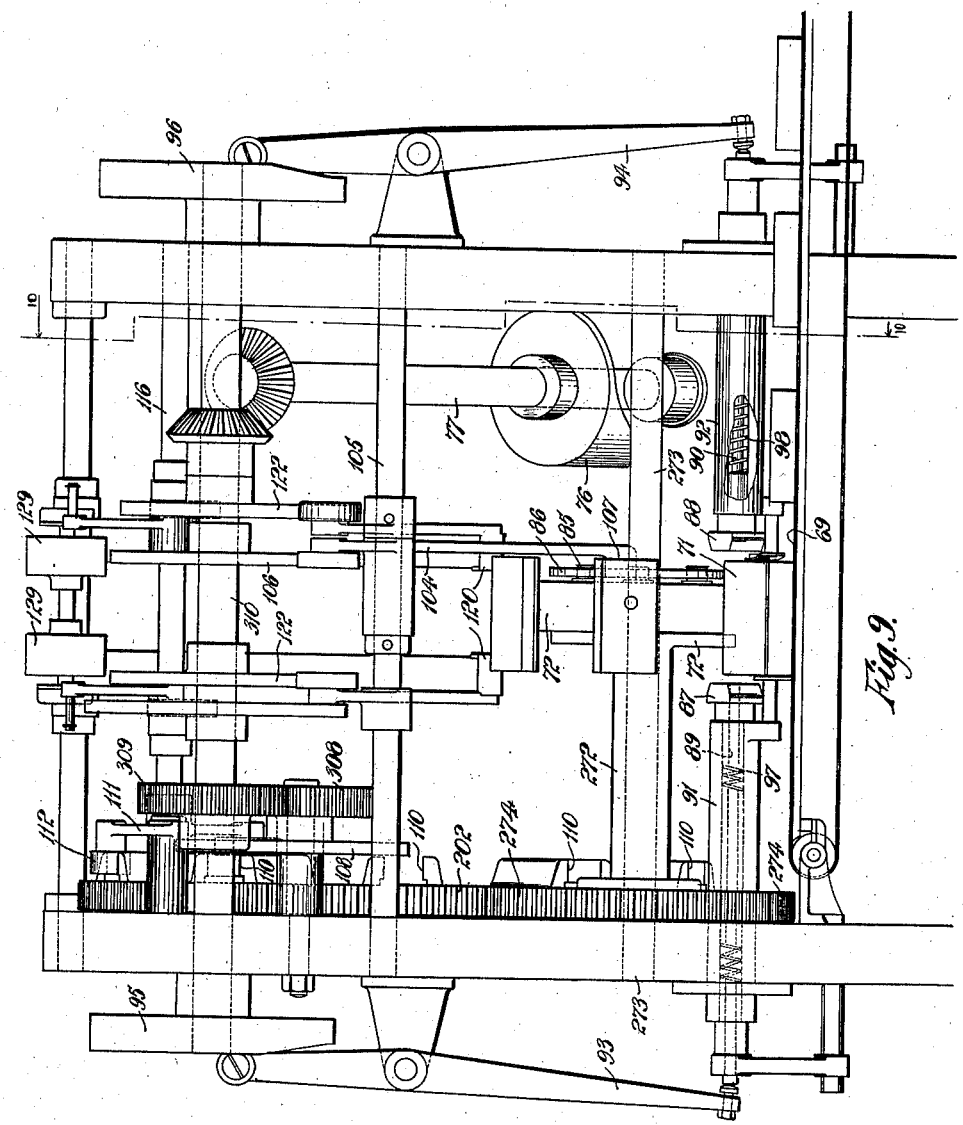

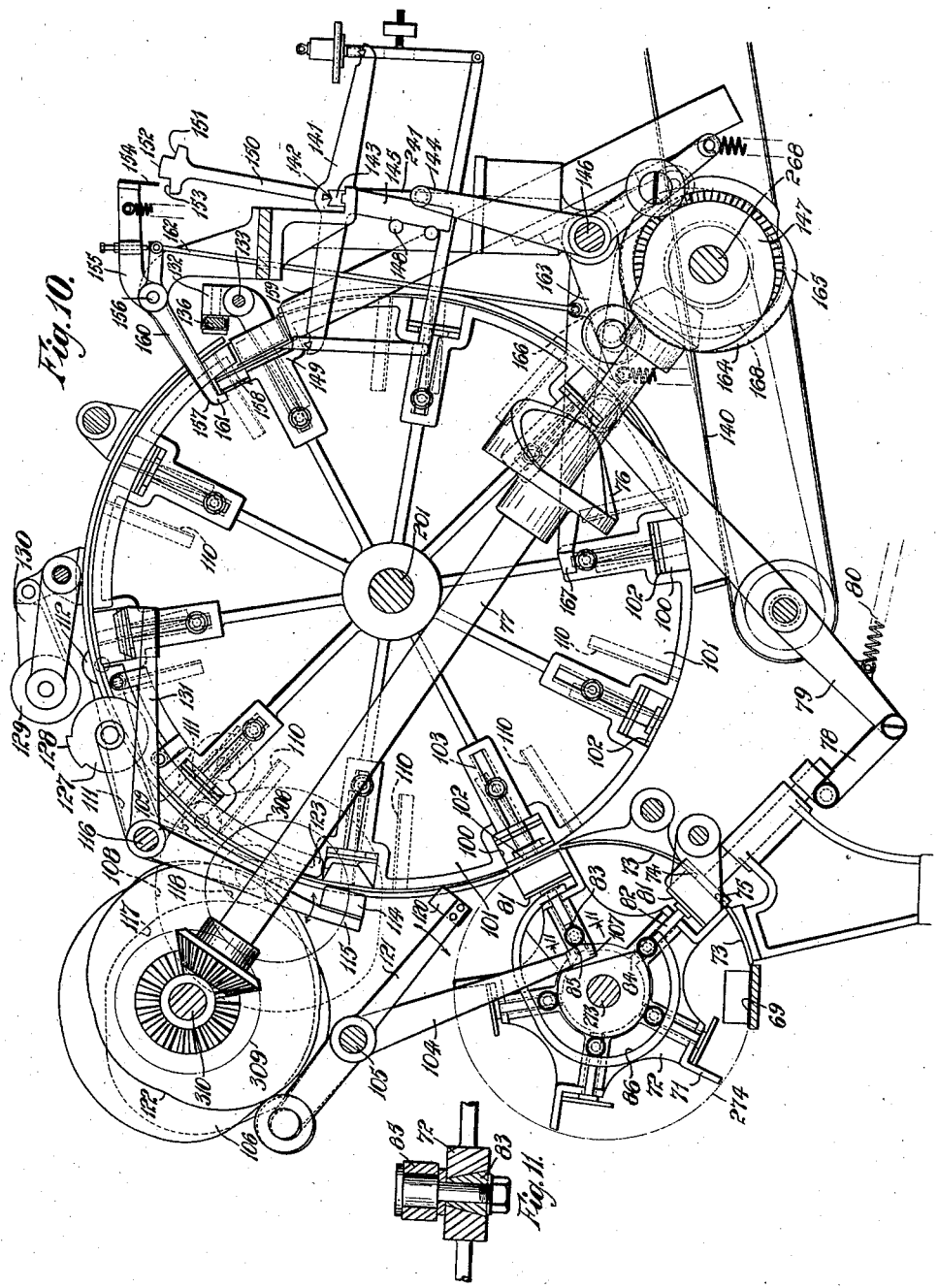

Jan. 17, 1939.　　　　　F. F. RUAU　　　　　2,144,201
PACKAGING TOBACCO
Filed Oct. 26, 1936　　　　10 Sheets-Sheet 10
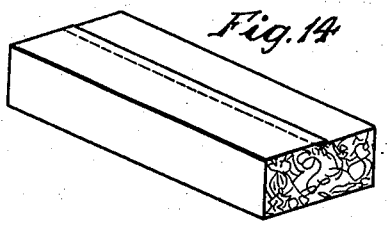
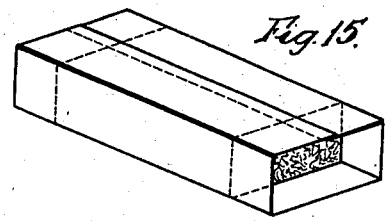
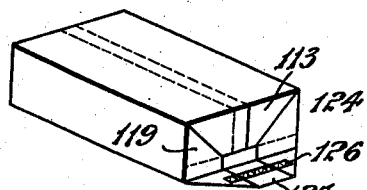
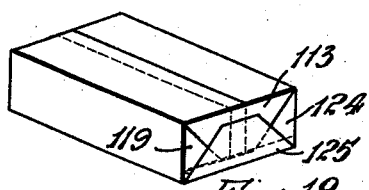
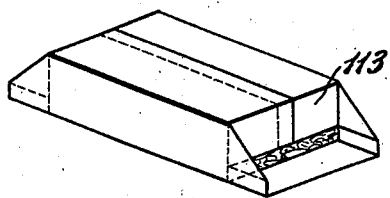
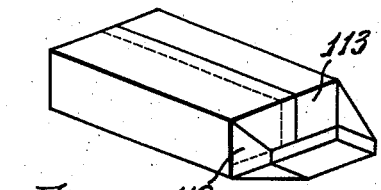
Inventors
F. F. Ruau
By Watson, Crit-Muse + Grindle
Attys.

Patented Jan. 17, 1939

2,144,201

UNITED STATES PATENT OFFICE 2,144,201

PACKAGING TOBACCO

Félix Frédéric Ruau, Deptford, London, England, assignor to Molins Machine Company, Limited, London, England Application October 26, 1936, Serial No. 107,728
In Great Britain November 5, 1935

13 Claims. (Cl. 93—3)

This invention is for improvements in or relating to packaging tobacco.

According to one form of the present invention, there is provided a method of packaging tobacco by forming a continuous wrapped core of tobacco, severing the wrapped core into lengths each having a tubular wrapper, compressing the tobacco core of the severed lengths lengthwise of the tubular wrapper to provide portions of wrapping material which extend beyond the ends of the compressed core, and folding those portions of wrapping material which extend beyond the ends of the compressed core to complete the packaging of the tobacco.

In a further form of the invention, there is provided a tobacco packaging machine comprising means to sever lengths from a continuous core of tobacco enclosed in a continuous tubular wrapper, means to engage a severed length and to compress the core lengthwise of the tubular wrapper, and means to fold the end portions of the tubular wrapper to close the open ends thereof.

In a further form of the invention there is provided a tobacco packaging machine comprising means to form a continuous core of tobacco, means to form a tubular wrapper about the said core, means to sever the wrapped core into lengths, means to engage the severed lengths and to compress the core lengthwise of the tubular wrapper to provide portions of wrapping material which extend beyond the ends of the compressed core, and means to fold said portions of wrapping material which extend beyond the ends of the compressed core to complete the tobacco package.

The invention will be described by way of example with reference to the accompanying drawings, in which:

Figures 1a and 1b show a side elevation of a machine for packaging tobacco.

Figures 2a and 2b show a plan of Figures 1a and 1b respectively.

Figure 3 is a section on the line 3—3 Figure 1b.

Figure 4 is a section on thel ine 4—4 Figure 1b.

Figure 5 is a section on the line 5—5 Figure 1a.

Figure 6 is a plan of cutting mechanism for severing a continuous tobacco core enclosed in a continuous tubular wrapper into lengths.

Figure 7 is a section on the line 7—7 Figure 6.

Figure 8 shows a detail of the apparatus shown in Figure 6.

Figure 9 shows a part of Figure 1a drawn to a large scale.

Figure 10 is a section on the line 10—10 Figure 9.

Figure 11 shows a detail of the apparatus shown in Figure 10.

Figure 12 is an end elevation of Figure 9.

Figure 13 is a detail to an enlarged scale showing the manner in which the tobacco core in a severed length is compressed lengthwise of the tubular wrapper.

Figures 14 to 19 inclusive show a tobacco package in various stages during its formation.

Like references refer to like parts throughout the specification and drawings.

Referring to Figures 1a and 1b, tobacco is fed from a hopper 20 and is delivered into a trough 21. The tobacco feeding apparatus 20 is shown diagrammatically in Figures 1b and 2b, and may be of any suitable form, a preferred form of tobacco feeding apparatus being described in British Patent Specification No. 441,402.

A tobacco conveying band 22 is arranged to move in the trough 21 and to receive the tobacco as it is showered from the tobacco feeding mechanism 20. Above the trough 21 there is arranged a pair of guides or chutes 23 and 24. The chutes 23 and 24 guide the tobacco into the trough 21. Most of the tobacco showered into the trough 21 is thrown against the chute 23 and to prevent the tobacco from piling up on that side of the trough which is opposite the chute 23, guides 25 are provided on the chute 23 to distribute the tobacco over the surface of the band 22.

The band 22 is formed into a substantially U shape whilst it is passing through the trough 21 and gradually accumulates tobacco on its surface as it passes beneath the tobacco feeding mechanism 20. The tobacco received by the band 22 is deposited thereby on to the surface of a continuous web 26 of wrapping material which is fed from a reel 27 and which may, if desired, pass through a printing mechanism, not shown, before the tobacco is delivered to the web 26. The web 26 passes over a guide 227 and is engaged by an endless band 28 which together with folding elements referred to below is operative to fold the web 26 about the core of tobacco which is received by the continuous web 26.

The continuous tobacco core may be formed by any suitable mechanism, but in the preferred form the mechanism is similar to that described in British Patent Specification No. 440,182. In this construction the tobacco whilst being transferred from the band 22 to the web 26 is compacted in order to raise the mass of the tobacco to substantially the mass which it is desired that the tobacco core shall have. In order to perform this operation, the band 22 moves at a greater speed than that of the web 26, and the point at which the tobacco is transferred from the band 22 to the web 26 is within a confined passage formed by a top plate 29, side guides 30, and a part of each of the surfaces of the band 22 and web 26 respectively. The mass of the tobacco which is moved into the confined passage is substantially at all points below the mass which it is desired that the continuous core of tobacco shall have, and as the tobacco moves from the faster moving band 22 and on to the slower moving web 26, it is, due to change of momentum, built up in the confining passage until it has acquired substantially the mass which it is desired that the tobacco core shall have. The built-up core of tobacco is continuously removed from the outlet of the confining passage by the continuous web 26.

The tobacco core received by the web 26 is moved together with the conveyor 28 through folding mechanism 31 which is operative to fold the conveyor 28 and the continuous web 26 about the tobacco core. As will be seen from Figure 5 and Figures 14 to 19, the cross section of the tobacco core is in the construction being described, substantially rectangular. The folding members 31 leave one longitudinal edge of the endless web 26 upstanding, as can be seen clearly in Figure 5, and a wheel 32 which receives adhesive from a transfer member 33 rotating in an adhesive supplying apparatus 34 is arranged to apply a line of adhesive to the upstanding edge of the web 26. A roller 35 is carried on a pivoted arm 36 and is urged by a spring towards the wheel 32 to press the upstanding edge of the web 26 against the periphery of the wheel 32.

When adhesive has been applied to the upstanding longitudinal edge of the web 26, the upstanding edge is folded so that it overlaps the other longitudinal edge of the web 26 and the continuous tobacco core is therefore enclosed in a continuous wrapper. The continuous wrapped tobacco core is then passed beneath a heating element 37 which dries the adhesive between the overlapping longitudinal edges of the continuous wrapper, and the continuous wrapped core then passes to mechanism indicated generally in Figure 1a by the reference 38, this mechanism being arranged to sever the continuous wrapped core into lengths.

The severing mechanism 38 is shown more clearly in Figures 6, 7 and 8, and from these figures it will be seen that the continuous wrapped core passes from the heating element to a reciprocating ledger 39, the ledger being secured to spring plates 40, the plates 40 being also secured at 41 to the bed 42 of the machine. The ledger 39 is reciprocated by means of an eccentric 43 in a manner such, that whilst a knife 44 is cutting the continuous wrapped tobacco core, the ledger is moving in the direction of movement of the wrapped tobacco core and at the same speed as that at which the wrapped tobacco core is moving. The knife 44 passes during the cutting operation between members 45 and 46 which form a slot 47 with which the knife cooperates to sever the continuous wrapped tobacco core into lengths. The knife 44 is carried on a spindle 48 which is mounted in a bracket 49 pivoted at 61 to the frame of the machine. The knife 44 is rotated by a pulley 50 keyed to the spindle 48 by a plate 51 secured to the pulley 50 and projecting into a keyway 52 in the spindle 48. The pulley 50 is connected by means of belts 53 and 54 to the main drive of the machine.

To permit the knife 44 to move with the ledger 39 during the severing operation, the spindle 48 which carries the knife 44 is slidably mounted in a sleeve 55 rotatable in bearings 56 and 57, see Figure 8. The ends of the spindle 48 are engaged by plates 58 and 59 secured to the ledger 39, as can be seen from Figures 6 and 7. As the ledger moves one of the plates 58 or 59 engages the spindle 48 and moves the spindle axially. The spindle slides relatively to the plate 51.

During the severing operation, the knife is also moved transversely of the path of the continuous wrapped tobacco core in order to cut through the core, and this movement is effected by a cam 60 which raises and lowers the knife 44 as indicated in Figure 7. To permit the knife 44 to be raised and lowered, the bracket 49 is pivoted at 61 and a tail 62 carries a cam follower 63, which engages with the cam 60. A spring 64 is provided to maintain the cam follower 63 in contact with the cam 60 and the two parts 49 and 62 together. This provides an adjustment by means of screw 262 to compensate for the wear on the knife.

When the tobacco core is first formed and wrapped it is not passed into the ledger 39 until the wrapped core is being properly secured. The improperly secured portion is, therefore, led into a receptacle (not shown) and to remove the improperly secured portion of the tobacco core, an auxiliary cutting device having a knife 65 is carried by an arm 66 pivoted at 67 and is moved into its operative position whilst the tobacco core is stationary. The knife 65 is rotated, and during the normal running of the machine the knife is pivoted about the point 67 and is held in the position shown in Figure 1a. In this position, it will be seen that the knife 65 does not engage with the wrapped tobacco core. In order to bring the knife 65 into operation, a handle 68 secured to the arm 66 is provided to enable the arm 66 to be pivoted about the point 67.

When a length has been severed from the continuous wrapped tobacco core by the knife 44, the severed length is received on a continuously moving band 69. The band 69 is arranged to move at a speed greater than the speed at which the continuous tobacco core is moving before the knife 44 operates to sever a length therefrom, and the severed lengths are therefore spaced apart on the band 69. Above the band 69, two endless spring bands 70 are provided, and are arranged to move so that the surface speeds of the bands 69 and 70 are substantially the same, the bands 70 being provided to control the severed lengths on the band 69 whilst they are being delivered by the band 69 to a position at which they are engaged by a conveyor 72 shown as a rotatable wheel having projections 71. The rotatable wheel 72 is carried by a sleeve 272 which is rotatable about a fixed shaft 273. To the sleeve 272 there is connected a gear wheel 274 which engages with a toothed wheel 202 described below. The projections 71 are arranged to move the severed lengths transversely to the direction in which they are moving as they leave the knife 44, and each severed length is moved by a projection 71 over the surface of a guide 73 to a position at which the tobacco core is compressed lengthwise of the tubular wrapper enclosing the core in order to provide end portions of wrapping material which may be folded to close the open ends of the tubular wrapper. The wheel conveyor 72 is rotated intermittently. At the position at which the tobacco core is compressed lengthwise of the tubular wrapper the severed length is engaged by a support shown as an angle piece 74 which engages two faces of a severed length. The angle piece 74 is carried by a spindle 75 and is moved into and out of the path of the severed lengths by means of a cam 76 secured to a shaft 77 driven from the main drive of the machine. The spindle 75 is connected with the cam 76 by a link 78 and pivoted lever 79, and is controlled by a spring 80. The angle piece 74 is in the position shown in Figure 10 when a severed length is moved into position to be engaged by the angle piece, and the angle piece is lowered after the tobacco core has been compressed lengthwise of the tubular wrapper and before the projection 71 operates again to move the severed length. The guide 73 is broken as shown in Figure 10 to enable the angle piece 74 to be moved into and out of position to engage the severed length. The upstanding part of the angle piece 74 is provided with slots and the upstanding portions project through slots in the end portion of the guide 73 over which the severed length is moved after being compressed lengthwise.

Whilst the severed length is engaged by the angle piece 74 it is also engaged by a transfer member 81 having a stem 82 secured to a sliding member 83 which moves in a slide 84 formed in the wheel 72. A transfer member 81 is, as will be seen from Figure 10, provided to co-operate with each of the projections 71 and is movable in synchronism with and relatively to its co-operating projection 71. To each of the members 83 a roller 85 is secured and moves in the track formed by a stationary box cam 86. The cam 86 causes the transfer members 81 to engage with the severed lengths when they are in the position in which they are engaged by the angle piece 74, and it will be seen from Figure 10 that each side of a severed length is therefore engaged and supported whilst the tobacco core is compressed lengthwise of the tubular wrapper.

The mechanism for compressing the tobacco core lengthwise of the tubular wrapper is shown in Figures 9 and 13. The tobacco core is engaged by two oppositely disposed pressing elements 87 and 88 which are carried on spindles 89 and 90, and which are slidable in sleeves 91 and 92 fixed to the frame of the machine. The pressing members 87 and 88 are moved towards and away from each other to effect the compression of the tobacco core lengthwise of its tubular wrapper by means of pivoted arms 93 and 94 operated by cams 95 and 96. Springs 97 and 98 are provided to control the pressing members 87 and 88. As will be seen more clearly from Figure 13, the pressing members 87 and 88 are provided on their side faces with recesses 99, the purpose of these recesses being to facilitate the compressing action of the pressing members. It will be seen from Figure 13 that the side faces of the pressing members 87 and 88 slope towards each other so as to provide the members with a lead to facilitate their insertion into the open ends of the tubular wrapper. It is found that by using the recesses 99, a small portion of tobacco adjacent to the sides of the tubular wrapper project from the ends of the pressed tobacco core, and that with this arrangement the closing of the open ends of the tubular wrappers is facilitated.

When the tobacco core has been compressed lengthwise of its tubular wrapper, the angle piece 74 is moved out of the path of the severed length and the wheel 72 again rotated, thereby causing the projection 71 engaging the severed length to move the severed length into a position at which the severed length is transferred into a pocket 100 of a second conveyor shown as a wheel 101 fixed to a shaft 201. Each pocket 100 of conveyor wheel 101 is provided with a transfer member 102 movable relatively to the pocket, the transfer member being slidable in guides 103 formed in the wheel 101, the transfer members 102 being held in position by frictional engagement with the guides 103. When a severed length is transferred from a wheel 72 into a pocket 100, the transfer element 102 is in the position shown in Figure 10, and as a transfer member 81 moves a severed length into the pocket 100, the transfer member 102 in that pocket is moved towards the bottom of the pocket to accommodate the severed length within the pocket. The transfer member 81 when transferring a severed length from the wheel 72 into a pocket 100, is operated by a bell crank lever 104 pivoted at 105 and operated by a cam 106. The end 107 of the bell crank lever 104 engages with the roller 85 carried by the sliding member 83. The transfer member 81, after it has transferred a severed length from the wheel 72, is returned to its normal position by the box cam 86.

The conveyor wheel 101 is intermittently rotated by means of a cam 108 which carries a roller 109 arranged to engage in slots 110 formed in the toothed wheel 202 fixed to shaft 201. The cam 108 is rotated by a gear wheel 308 which co-operates with a gear wheel 309 fixed on a shaft 310, the shaft 310 being rotated by gearing connected with the shaft 77.

The cam 108 also operates a bell crank lever 111 which carries a roller 112 arranged to engage in a slot 110 so as to lock the wheel whilst it is not being rotated.

The wheel 101 moves the severed length past folding mechanism which closes the open ends of the tubular wrapper, and past an adhesive applying device which applies adhesive to the folded end portions of the wrapper in order securely to close the open ends thereof. The sequence in which the open ends of the tubular wrappers are closed is shown clearly in Figures 15 to 19, the folds 113 being formed by folders 114 connected with one arm 115 of a bell crank lever pivoted at 116 operated by a cam 117, a cam follower 118 being secured to the arm 115. The folds 119 are formed by folders 120 secured to arms 121 pivoted at 105 and operated by a cam 122. The folds 113 and 119 are formed whilst the severed length is in one position, and as the conveyor wheel 101 moves the severed length to the next position, stationary folders 123 are arranged to form the folds 124. The partly closed ends of the tubular wrapper now have the form shown in Figure 18, and before the remaining closure flap 125 is folded upwardly into engagement with the other folds to complete the closure of the ends of the tubular wrapper, a line of adhesive 126 is applied to the flap 125. The line of adhesive 126 is applied to the flap 125 by a roller 127 having an adhesive applying surface 128, the surface 128 receiving adhesive from a roller 129 rotating in a bath 130 of adhesive. The adhesive is applied to the flap 125 whilst the severed length is being moved into position to be engaged by an arm 131 of the bell crank lever, the other arm of which operates to form folds 113 and by this arrangement the cam 117 operates to form the fold 113 of one severed length and the fold 125 of another severed length simultaneously.

The conveyor wheel 101 carries the completed packages to a position at which the packages are removed from the pockets 100 of the conveyor and are placed on to the scale pan of a weighing mechanism. The weighing mechanism is shown in Figure 10, and will be described below, and the mechanism for transferring the completed packages from the pockets 100 to the scale pan of the weighing mechanism is shown in Figure 12.

As can be seen from Figure 12, two weighing mechanisms are provided, one being disposed on each side of the conveyor 101. This arrangement of the weighing mechanism enables the machine to work at a higher speed than if only one weighing mechanism were used. The severed lengths are removed from the pockets 100 by package engaging faces 134 or 135 connected with a rod 133 which slides in the frame of the machine. The package engaging faces 134 are arranged to transfer a package from the conveyor 101 into the scale pan of the weighing mechanism shown on the right of Figure 12, whilst the package engaging faces 135 are arranged to transfer a package from the conveyor to the scale pan of the weighing mechanism shown on the left of Figure 12. The rod 133 is operated by a link 136 connected with a pivoted arm 137 and with a block 132, the arm 137 having mounted thereon a cam follower 138 which engages with a cam 139. The arrangement of the package engaging faces 134 and 135 is such, that whilst one pair of faces is transferring a package from the conveyor 101 to the scale pan of a weighing device, the other pair of package engaging faces is, if the weight of the package is within the predetermined limits, transferring such package from the scale pan back to a pocket 100 of the conveyor 101. The package which is so replaced in the conveyor 101 being moved thereby until it is in position above a conveyor 140, at which position it is ejected from the conveyor 101 and delivered to the conveyor 140 which removes the package to any desired position. Whilst the package is on the scale pan, the package engaging faces which have transferred it to the pan are moved slightly by the cam 139 so that the package is not engaged by the package engaging faces during the weighing operation.

One of the weighing mechanisms is shown more clearly in Figure 10, and comprises a weigh beam 141 provided with knife edge suspensions, the weigh beam being carried by parallel link supports. Whilst a package is being moved on to or off of the scale pan, the weigh beam 141 is raised so that the knife edge 142 is lifted off of block 143, and this action is performed by an arm 144 engaging with a projection 145 secured to the weigh beam 141 engaging with two fixed stops 148 mounted on a supporting bracket 241. The arm 144 is oscillated about its pivot 146 by cam 147, and the arm 144 moving the projection 145 against the pair of fixed stops 148 and causing the knife edge 142 to be raised from the block 143. When the knife edge 142 is raised as shown in Figure 10, the scale pan 149 is held in a rigid position to enable the article engaging faces either to place an article on the scale pan, or to remove one therefrom. To the weigh beam 141 there is secured a selector plate 150 having faces 151, 152 and 153. The face 152 co-operates with a selector 154 if the weighed article is within predetermined limits, whilst if the article is too heavy or too light, the selector 154 moves downwardly towards one or other of the faces 151 and 153. The selector 154 is carried by a bell crank lever 155 pivoted at 156, one end of the bell crank 155 being provided with a hook 157 which engages with a projection 158 secured to a chute 159, the chute being arranged to receive packages whose weight is not within the predetermined limits, and to deliver them to some point away from the point to which those packages whose weights are within the prescribed limits are delivered. About the pivot 156 is also pivoted a further bell crank 160, one arm of which is provided with a catch 161, the other being secured to a link 162 connected with a bell crank lever 163 pivoted about the pivot 146.

The bell crank lever 163 is operated by a cam 164 and operates to release the catch 161 each time a weighing operation is effected. To dampen the oscillation of the weigh beam a dash-pot 344 of any suitable construction is provided. If, after a weighing operation the selector 154 rests on the surface 152 of the selector plate 150, the catch 157 holds the chute 159 in position, but if, on the other hand, the selector plate has, after a weighing operation, been moved towards one or other of the faces 151 and 153, the catch 157 releases the chute 159 and a cam 165 operates a lever 166 which is secured to the chute 159 and pivoted about a pivot 146. The cam 165 causes the chute 159 which is provided with a bridge 259 over which the package is passed when it is within the predetermined limits or is being moved onto a scale pan, to be moved out of the path of the package as it is transferred from the scale pan. The package is thereby prevented from being reinserted into a pocket 100 of the conveyor 101. The package falls into the chute 159 and is delivered as above stated to some suitable point. If the weight of a package is within the prescribed limits, it is, as previously stated, moved from the scale pan into a pocket 100 of the conveyor 101, and the conveyor moves the package to a position at which it is ejected and transferred to the conveyor 140. At this position, the transfer member 102 is engaged by an ejector 167 pivoted about pivot 146 and controlled by a cam 168. The ejector 167 causes the transfer element 102 to move the package out of the pocket 100.

As will be seen from Figure 10, the shaft 77 is connected with gearing which serves to operate the cams 139, 147, 164, 165 and 168. The shaft 268 is rotated at one half the speed at which the shaft 77 is rotated because the weighing mechanisms are each dealing with one half of the packages carried by the second conveyor 101.

What I claim as my invention and desire to secure by Letters Patent is:

1. A tobacco packaging machine comprising means continuously to move a continuous tobacco core enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, means to engage a severed length and to compress the core lengthwise of the tubular wrapper, and means to fold the end portions of the tubular wrapper to close the open ends thereof.

2. A tobacco packaging machine comprising means continuously to move a continuous tobacco core enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, a device disposed above said conveyor at a position adjacent the place at which the severed lengths are first received by the conveyor, said device cooperating with the conveyor to grip the severed lengths as they pass from the cutting device and positively to position the severed lengths on the conveyor, means to engage a severed length and to compress the core lengthwise of the tubular wrapper, and means to fold the end portions of the tubular wrapper to close the open ends thereof.

3. A tobacco packaging machine comprising means continuously to move a continuous tobacco core enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, a movable surface disposed above said conveyor at a position adjacent the place at which the severed lengths are first received by the conveyor, said movable surface cooperating with the conveyor, the cooperating surfaces being movable at substantially the same linear speed and in the same direction, to grip the severed lengths as they pass from the cutting device and positively to position the severed lengths on the conveyor, means to engage a severed length and to compress the core lengthwise of the tubular wrapper, and means to fold the end portions of the tubular wrapper to close the open ends thereof.

4. A tobacco packaging machine comprising means continuously to move a continuous tobacco core enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart endwise, an endless band disposed above said conveyor and cooperating therewith, the cooperating surfaces of the endless band and the conveyor being movable at substantially the same linear speed and in the same direction, to grip the severed lengths as they pass from the cutting device and positively to position the severed lengths on the conveyor, means to engage a severed length and to compress the core lengthwise of the tubular wrapper, and means to fold the end portions of the tubular wrapper to close the open ends thereof.

5. A tobacco packaging machine comprising means continuously to move a continuous tobacco core enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, means to receive the severed lengths from the conveyor and to move the severed lengths transversely of their length, means to engage a severed length and to compress the core lengthwise of the tubular wrapper, and means to fold the end portions of the tubular wrapper to close the open ends thereof.

6. A tobacco packaging machine comprising means continuously to move a continuous tobacco core enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, means to engage a severed length and to compress the core lengthwise of the tubular wrapper, a support for each of the sides considered transversely of the length of the severed length during the lengthwise compression of the core, and means to fold the end portions of the tubular wrapper to close the open ends thereof.

7. In a tobacco packaging machine the combination with a conveyor to move a succession of severed lengths lengthwise, of a member rotatable about an axis substantially parallel with the direction of movement of the lengths on the conveyor, a projection carried by said member and movable therewith to engage a side of a severed length to move the latter transversely off of the conveyor, a guide adjacent the path traversed by the projection to support a severed length, and an element movable with said member and relatively thereto to engage a severed length being moved by the member and to move the severed length out of the path of said member.

8. A tobacco packaging machine comprising means continuously to move a continuous tobacco core enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, means to receive the severed lengths from the conveyor and to move the severed lengths transversely of their length, means to engage a severed length and to compress the core lengthwise of the tubular wrapper, a rotatable carrier having pockets to receive the severed lengths after the endwise compression has been effected, means operative upon the severed lengths in said pockets to fold the end portions of the tubular wrapper to close the open ends thereof, and means to eject completed packages from said pockets.

9. A tobacco packaging machine comprising means continuously to move a continuous tobacco core enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, means to receive the severed lengths from the conveyor and to move the severed lengths transversely of their length, means to engage a severed length and to compress the core lengthwise of the tubular wrapper, a rotatable carrier having pockets to receive the severed lengths after the endwise compression has been effected, means operative upon the severed lengths in said pockets to fold the end portions of the tubular wrapper to close the open ends thereof, and an element disposed in a pocket and movable relatively thereto to eject a completed package from the pocket.

10. A tobacco packaging machine comprising means continuously to move a continuous tobacco core of substantially rectilinear cross-section enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, means to engage a severed length and to compress the core lengthwise of the tubular wrapper, and means to fold the end portions of the tubular wrapper from the four sides of the end faces of the compressed core and into overlapping formation to close the open ends thereof.

11. A tobacco packaging machine comprising means continuously to move a continuous tobacco core of substantially rectilinear cross-section enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, means to engage a severed length and to compress the core lengthwise of the tubular wrapper, means to fold the end portions of the tubular wrapper from the four sides of the end faces of the compressed core and into overlapping formation to close the open ends thereof, and means to secure the overlapping folds in position.

12. A tobacco packaging machine comprising means continuously to move a continuous tobacco core of substantially rectilinear cross-section enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, means to receive the severed lengths from the conveyor and to move the severed lengths transversely of their length, means to engage a severed length and to compress the core lengthwise of the tubular wrapper, a rotatable carrier having pockets to receive the severed lengths after the endwise compression has been effected, folding elements movable relatively to and in timed relationship with the rotatable carrier to fold the end portions of the tubular wrapper into overlapping formation to close the open ends thereof, and means to eject completed packages from said pockets.

13. A tobacco packaging machine comprising means continuously to move a continuous tobacco core of substantially rectilinear cross-section enclosed in a continuous tubular wrapper in a lengthwise direction, a cutting device to sever lengths from the continuous wrapped core, a conveyor moving at a linear speed greater than that of the continuous wrapped core to receive the severed lengths and to space them apart lengthwise, means to receive the severed lengths from the conveyor and to move the severed lengths transversely of their length, means to engage a severed length and to compress the core lengthwise of the tubular wrapper, a rotatable carrier having pockets to receive the severed lengths after the endwise compression has been effected, folding elements movable relatively to and in timed relationship with the rotatable carrier to fold the end portions of the tubular wrapper into overlapping formation to close the open ends thereof, means to secure the overlapping folds in position, and means to eject completed packages from said pockets.

FÉLIX FRÉDÉRIC RUAU.